Figure 1:
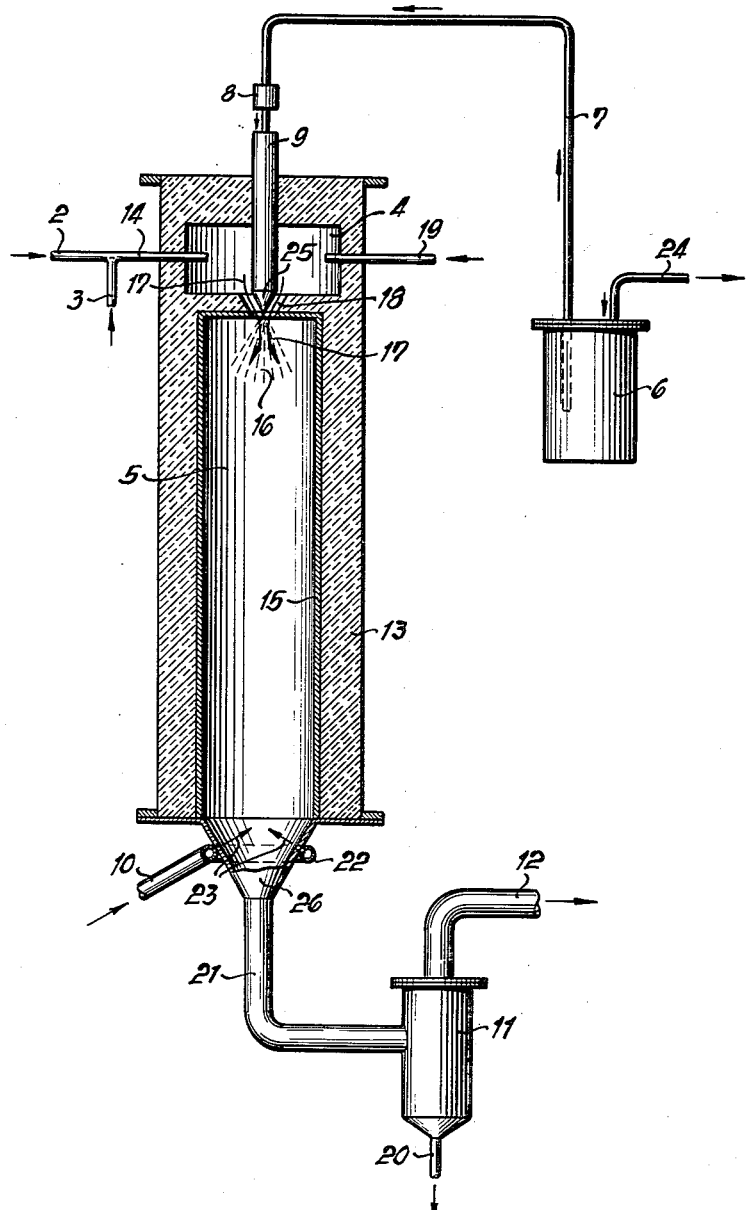

INVENTORS:
KURT SENNEWALD,
KLAUS BORN,
HEINZ ERPENBACH,
GÜNTHER DOBEK
BY Connolly and Hutz
THEIR ATTORNEYS

United States Patent Office 3,079,420
Patented Feb. 26, 1963

3,079,420
PROCESS FOR THE PREPARATION OF UNSATURATED CARBOXYLIC ACID DERIVATIVES
Kurt Sennewald, Knapsack, near Koln, Klaus Born, Hermulheim, near Koln, Heinz Erpenbach, Rodenkirchen, near Koln, and Günther Döbek, Koln, Germany, assignors to Knapsack-Griesheim Aktiengesellschaft, Knapsack, near Koln, Germany, a corporation of Germany
Filed Mar. 19, 1959, Ser. No. 800,463
Claims priority, application Germany Mar. 25, 1958
4 Claims. (Cl. 260—464)

The present invention relates to a process for the preparation of unsaturated carboxylic acids and/or their derivatives. More particularly it relates to a process for the preparation of unsaturated carboxylic acid nitriles. The invention also provides an apparatus suitable for use in carrying out the process of the invention.

U.S. Patent No. 2,790,822 provides a process for preparing aliphatic $\alpha,\beta$-unsaturated carboxylic acids and/or their derivatives by splitting off water from $\alpha$-hydroxy-carboxylic acids containing at least 3 carbon atoms or from their derivatives containing free $\alpha$-hydroxy groups. The process is carried out at elevated temperatures, preferably at temperatures within the range of 400° C. to 700° C. in the presence of a catalyst consisting of a hydrous inorganic acid, especially a phosphoric acid, which may be supported on a carrier, the duration of stay being short. The dehydration is brought about by atomizing the mixture consisting of the $\alpha$-hydroxycarboxylic acids or their derivatives and the hydrous inorganic acids, if desired, in vacuo, into a heated reaction chamber. The dehydration may be carried out in the presence of steam as a diluent. The reaction furnace may be heated from outside or by introducing hot, inert, oxygen-free gases into the interior of the furnace, the gases acting directly on the reaction mixture.

Especially, the latter method offers the advantage that it can easily be carried out industrially because the hot gases can easily be produced by burning fuels of any kind with a slight deficiency of air or oxygen.

The $\alpha$-hydroxy-carboxylic acids and their derivatives which have hitherto been used as saturated compounds which, apart from the $\alpha$-hydroxy group, do not contain any functional groups. Saturated $\alpha$-hydroxy-carboxylic acid nitriles are particularly suitable for the above-mentioned technique of dehydration. The dehydration of the two saturated $\alpha$-hydroxy carboxylic acid nitriles, viz. the dehydration of lactic acid nitrile and $\alpha$-hydroxy-valeric acid nitrile which results in the formation of acrylonitrile and $\beta$-ethyl-acrylonitrile respectively, is, for example, carried out accordingly.

Now, we have found the $\alpha$-hydroxy-carboxylic acid nitriles which are extremely sensitive to the increase of temperature and which are unsaturated from the beginning, as well as $\alpha$-hydroxy-carboxylic acid nitriles containing an $\alpha$-hydroxy group and further functional groups, and cyclic cyanohydrins can be dehydrated and converted into the corresponding unsaturated nitriles by the same above described process. This is possible in spite of the application of high temperatures which is necessary for the dehydration by providing for an extremely intense atomization of the reaction mixture of phosphoric acid and the compound to be dehydrated and a very thorough mixing of the superheated burnt gases that have been introduced and the spray of the reaction mixture produced by the atomization and by avoiding thereby above all any local superheating of these very sensitive substances.

In this case, too, it is in principle possible to apply the method of U.S. Patent No. 2,790,822. According to the present invention, the process for splitting off water from $\alpha$-hydroxy-carboxylic acids and/or their derivatives at elevated temperatures, preferably ranging from 400° C. to 700° C., in a short period of time in the presence of a catalyst consisting of a hydrous inorganic acid, preferably phosphoric acid, by atomizing the mixture of $\alpha$-hydroxy-carboxylic acid or its derivatives and the hydrous inorganic acids into a heated reaction chamber is advantageously carried out as follows: The reaction chamber is heated by the introduction of hot, inert gases that are free from oxygen and the reaction mixture is finely sprayed into the reaction chamber within the current of the hot, inert gases that are free from oxygen and preferably contain steam. The direction in which the starting mixture is atomized is preferably the same as the direction of the current of the hot gases.

The hot inert gases that are free from oxygen can, for example, be obtained by burning a mixture of illuminating gas and air. The gases obtained by burning a mixture of this kind which contains hydrogen also contains steam so that a supplementary introduction of steam can be dispensed with. If desired, an additional amount of steam may be introduced. It is also possible to use gaseous mixtures that are from the beginning free of steam. Before being introduced into the reaction chamber, the burnt gases are cooled to temperatures within the range of about 800° C. to about 1400° C. by mixing them with cold nitrogen or with waste gases that are free from oxygen, for example, with combustion gases and/or steam. In the process of the invention, the gases leaving the combustion chamber and flowing into the reaction furnace not only serve to heat the reaction chamber, but at the same time they constitute the moved medium within which the fine atomization of the reaction mixture takes place. This ensures a smooth course of the dehydration even in cases in which substances are used that are very sensitive and can be decomposed relatively easily.

According to another form of the present invention, the reaction gases leaving the reaction chamber are cooled by direct injection of water or hydrous phosphoric acids. This cooling and washing liquid is subsequently separated as distillation residue from the reaction products partly contained therein, together with the acid which has been introduced into the reaction chamber in the form of the atomized starting mixture. The chief portion of the reaction products is, however, in general not condensed by the injection cooling but removed by means of the carrier gases.

The separation of the final products, for example, the nitriles containing several olefinic bonds from the reaction gases constitutes a particular part of the method of the invention. It has been observed that readily polymerizing substances, such as the cyanobutadienes, cannot simply be isolated by the usual methods, for example, by washing the reaction gases with organic substances and by subsequently distilling the wash liquid, no essential portions of the monomers being polymerized during the distillation. It has been found that the final products obtained, for example, 1-cyanobutadiene are very easily volatilized with steam and can consequently be separated in a simple manner under normal pressure or in vacuo from the appropriate washing liquids by a steam distillation. No cyanobutadiene is lost by polymerization. As washing liquids, there are advantageously used, as has already been mentioned, water or aqueous solutions, for example, hydrous phosphoric acids.

It is of great importance to the process of the present invention that, contrary to the process described in U.S. Patent No. 2,790,822 there may be used as starting materials compounds whose properties and chemical behaviour are characterized by the neighbouring position of the cyanohydrin group and the ethylene double bond which are present in the form of cyclic derivatives. With regard to their reactivity, the compounds of the first-mentioned group can be compared with acrolein or its cyanohydrin. It is, for example, known that the cyanohydrin of methyl-vinyl-ketone can very easily and in a quantitative yield be rearranged to form levulinic acid nitrile. For this reason, it is inter alia not possible to prepare methylvinyl-ketone-cyanohydrin by the methods that are generally applied for the manufacture of the cyanohydrins of saturated aldehydes. The same applies to the preparation of the cyanohydrin of crotonaldehyde. It is also known from the literature that in the aforesaid cases the usual methods yield but sticky resinified masses which according to a nitrogen analysis must have formed by the polymerisation of cyanohydrin that had already been formed and excess aldehyde. It is also known that the unsaturated α-hydroxycarboxylic acid nitriles, the cyanohydrins containing further functional groups and the cyclic cyanohydrins are more sensitive to the increase of temperature than the saturated aliphatic cyanohydrins containing no functional groups beside the α-hydroxy group. When the aforesaid substances are heated to about +100° C. occasional rearrangements take place—for example methyl-vinyl-ketone cyanohydrin is rearranged, as has already been mentioned, to form levulinic acid nitrile. In general, however, the products are even decomposed, said decomposition partially proceeding with the splitting off of HCN and re-formation of the unsaturated carbonyl compounds. These unsaturated substances, for example, methyl-vinyl-ketone, polymerize very readily however at elevated temperatures and bring about further resinifications.

In view of this state of things, it was not to be foreseen but surprising that the dehydration of the unsaturated α-hydroxy-carboxylic acid nitriles and the α-hydroxy-carboxylic acid nitriles containing further functional groups, for example, acetaldol-cyanohydrin and the cyclic cyanohydrins would after all be possible at at the temperatures necessary for this process, viz. at temperatures within the range of about +500° C. to +700° C., and yield the desired final products.

According to the process of U.S. Patent No. 2,790,822, the dehydration of the abovementioned substances yields but small quantities of product and, besides, troublesome resinifications occur in the apparatus. It was only the knowledge that it was necessary to heat the unsaturated cyanohydrins and the cyanohydrins containing functional groups, which cyanohydrins are very sensitive to an increase of temperature, and the cyclic cyanohydrins in admixture with the hydrous phosphoric acids within a fraction of a second to the reaction temperature and to provide at the same time for an extremely fine atomization of the reaction mixture that enabled the experiments to be successfully carried out. At the same time, a very thorough mixture of the hot, for example burnt, gases with the spray of the reaction mixture is necessary. When operating under these conditions, the dehydration yields good yields. By the measures according to the invention, resinifications in the apparatus are also avoided.

For the preparation of aliphatic α,β,γ,δ-unsaturated carboxylic acids and/or their derivatives there may be used according to the method of the present invention β,γ-unsaturated or γ,δ-unsaturated α-hydroxy-carboxylic acids or α-alkyl-α,β-dihydroxy-carboxylic acids and α-hydroxy-γ-hydroxy-carboxylic acids and/or their derivatives. For the preparation of 1-cyanobutadiene-(1,3) there may, for example, be used crotonaldehyde cyanohydrin or acetaldol cyanohydrin.

The preparation of nitriles containing several olefinic bonds from unsaturated α-hydroxy-nitriles, α-alkyl-α,β-dihydroxy-nitriles or α,γ-dihydroxynitriles has hitherto only been possible in a complicated way, namely by way of the corresponding acylhydroxy compounds. These compounds are subjected at a temperature within the range of about 500° C. to 600° C. to an ester pyrolysis which yields a mixture of the corresponding acids with the nitrile containing several olefinic bonds. These known processes have the drawback that valuable acylation agents, such as acetic anhydride and acetyl chloride are required for the esterification of the free cyanohydrins and, besides, the separation of the reaction mixture into, for example, acetic acid and 1-cyanobutadiene is difficult. All these disadvantages have been removed by the present invention which enables the aforesaid compounds to be prepared in a much more simple and economic way.

2-cyanobutadiene-(1,3) can now be prepared from methylvinyl-ketone-cyanohydrin, acetoin-cyanohydrin and also from the cyanohydrin of 3-keto-butanol-1. For the preparation of 1-cyanocyclohexene-1 there is accordingly used cyclohexanone-cyanohydrin.

The apparatus for carrying out the process of the invention advantageously comprises a reaction furnace above which a combustion chamber is arranged. From the combustion chamber, the hot gases pass into the reaction furnace through an annular slot in the centre of which terminates a nozzle. The reaction mixture which is under pressure leaves the said nozzle in a finely sprayed form. The annular slot has a conical shape and is thereby adapted to the tapering end of the centrally mounted head of the nozzle, the tapering end facing the reaction furnace. The combustion chamber may likewise be mounted so as to be in a different position with respect to the reaction furnace.

At the outlet of the reaction furnace, there may be arranged an annular tube supplied with hydrous phosphoric acid which is injected from the tube into the reaction gases that flow off. The interior of the reaction furnace is advantageously lined with refined steel.

An apparatus suitable for use in realizing the method of the invention is shown diagrammatically by way of example in the accompanying drawing.

Referring to the drawing, FIGURE 1 illustrates an apparatus consisting of a reaction furnace 5 and a combustion chamber 4 arranged above the furnace 5. The wall surrounding the reaction furnace is represented by the numeral 13 and the refined steel lining of the reaction chamber is represented by the numeral 15. The pipe 14 which supplies the mixture of air and heating gas and the pipe 19 which supplies cooling gas, for example nitrogen or, if desired, steam, discharge into the combustion chamber 4. The mixture of air and heating gas consists, for example, of illuminating gas supplied via pipe 2 and combustion air supplied via pipe 3. The combustion air is always supplied in a quantity a little smaller than that of the other gas in order to keep the combustion gases completely free from oxygen.

By means of the pressure nitrogen entering at 24, the mixture of hydrous phosphoric acid and the organic starting material is forced from the storage vessel 6 through the tube 7 and the filter 8 into the nozzle 9 and at the tapering end of the nozzle head 25 it is finely atomized. The head of the nozzle is mounted so as to be in the centre of the conical annular slot 18 through which the gas jet 17 arriving from the combustion chamber 4 enters the reaction furnace 5, said gas jet 17 being at once thoroughly mixed with the jet 16 of the atomized reaction mixture leaving the point of the nozzle head 25.

At the outlet 26 of the reaction furnace 5, an annular pipe 22 is arranged which is fed via a conduit 10 with aqueous phosphoric acid. At 23, this acid is immediately injected for the purpose of cooling into the reaction mixture leaving the reaction chamber. The cooled mixture consisting of aqueous phosphoric acid and the reaction gases flows through the pipe 21 into the separator 11 from which the phosphoric acid is drawn off at 20 while the reaction gases which consist of the carrier gases and the gaseous reaction products are drawn off via pipe 12 and subsequently worked up. The phosphoric acid drawn off at 20 is freed by distillation from the excess of water and the portion of reaction products it contains, it is mixed with the organic starting product and then re-cycled to the storage vessel 6.

The construction of the apparatus that has been described ensures a quick, uniform and thorough mixing of the reaction mixture that is atomized in the nozzle 9 and the superheated gases produced in the combustion chamber 4 and it consequently enables a local superheating of the compounds to be dehydrated to be avoided.

There are also other apparatus that are suitable for use in carrying out the process of the invention. It is, however, essential in each case that an intense atomization is brought about and that at the same time a uniform heat transfer from the heating gases to the reaction mixture takes place.

It should, furthermore, be mentioned that great difficulties were encountered when the process described in U.S. Patent No. 2,790,822 was to be carried out in continuous operation. These difficulties caused considerable and unexpected losses of the yield. When operating according to the process of U.S. Patent No. 2,790,822 and using as starting material, for example, α-hydroxy-carboxylic acid nitriles or α-hydroxy-carboxylic acid amides, there are obtained as reaction products not only the desired α,β-unsaturated nitriles but, in addition thereto, a very considerable quantity of the aldehydes and ketones corresponding to the α-hydroxy-carboxylic acid nitriles and amides used as starting material. Although these keto compounds can easily be transformed again into the cyanohydrins used as starting material by means of the hydrocyanic acid which is at the same time obtained as reaction product, and again be applied in the process, the reaction has to be carried out carefully when these compounds are present, for they are extremely sensitive when heated and can very easily be cracked. The resulting splitting products, one of which is, for example, elementary carbon, inevitably admix with the hydrous phosphoric acid obtained at the outlet of the reaction furnace and render the concentration of the phosphoric acid which is necessary for its re-utilisation, difficult.

In order to avoid these disadvantages, especially the cracking, it is, therefore, absolutely necessary that the hot burnt gases are very quickly and thoroughly mixed with the liquid mists obtained by the atomization of the reaction mixture. By this method, a local superheating and consequently thermal decomposition of the reaction products are avoided. If the reaction is not carried out in such a careful way it is to be taken into account that the above-mentioned undesired attendant phenomena occur and that consequently poorer yields are obtained.

Since the splitting of the cyanohydrins into keto compounds and hydrocyanic acid is endothermic, a local superheating, that is to say a carrying through of the reaction in an inappropriate manner, also involves an increased formation of these keto compounds which in their turn give rise to the above-mentioned attendant phenomena, especially the cracking. In the known process, about 30 mol percent of the starting product used, for example, in the form of cyanhydrins, undergoes such an undesired recracking into keto compound and hydrocyanic acid whereas about 70 mol percent is converted into the α,β-unsaturated nitriles. When the reaction is carried out in an inappropriate manner, the proportion of undesired and desired final products may become so unfavourable that 30 to 50 and more mol percent of the starting material used is split into keto compounds and hydrocyanic acid and only 50 to 70 mol percent or even less is converted into the corresponding desired α,β-unsaturated nitrile.

Another difficulty of the method according to U.S. Patent No. 2,790,822 is that the organic substances participating in the reaction may be cracked at the walls of the reaction chamber and coke there. Layers of coke that have once formed on the walls will increase until they extend throughout the cross-sectional area of the chamber and by partially or completely clogging said chamber they will prevent the passage of the gas so that the operation has to be interrupted and the reaction chamber cleaned. This phenomenon is due to the fact that highly concentrated phosphoric acids condense at the cooler walls of the reaction furnace so that the organic particles can adhere there and they inevitably coke. These phenomena of condensation do not only cause the separation of the coke but they also give rise to considerable corrosion if the wall of the reaction furnace is made of the generally applied metallic material.

It is also necessary to prevent the liquid particles of the reaction mixture consisting of aqueous phosphoric acid and organic starting substance, which is sprayed into the reaction chamber, from coming into contact with the hot walls of the furnace before the organic portions have vaporized. If no attention is payed to this, the liquid particles that come into contact with the wall will in their turn give rise to a coking of the organic substances taking place besides the additional formation of undesired saturated and unsaturated foreign nitriles which causes a contamination of the α,β-unsaturated carboxylic acid nitrile desired as final product and corresponding to the α-hydroxy-carboxylic acid nitrile or amide which has, for example, been used as starting material. For example, when preparing acrylonitrile from lactic acid nitrile, there are substantially obtained as foreign nitriles propionic acid nitrile and crotonic acid nitrile and in addition thereto a minor quantity of methacrylic acid nitrile, cyanobutadiene and acetonitrile. In cases in which the process is carried out according to the known manner described in U.S. Patent No. 2,790,822 with the use of lactic acid nitrile, the total quantity of the foreign nitriles obtained as by-products may amount to about 4 to 8% by weight of the acrylonitrile obtained.

In summary: the known method of operating has the following drawbacks.

(1) Formation of the keto compounds corresponding to the α-hydroxy-carboxylic acid nitriles and amides and their thermal decomposition with formation of cracking products which render the re-utilisation of the aqueous phosphoric acids used as catalysts difficult;

(2) Formation of deposits of coke in the reaction furnace;

(3) Formation of relatively large quantities of undesired foreign nitriles.

In the process for preparing α,β-unsaturated carboxylic acids and/or their derivatives according to the invention by splitting off water from α-hydroxy-carboxylic acids and/or their derivatives at elevated temperatures, preferably temperatures ranging from 400° C. to 700° C., in a short time period in the presence of a catalyst consisting of a hydrous inorganic acid, preferably a phosphoric acid, by atomizing the mixture of α-hydroxy-carboxylic acids or their derivatives and the hydrous inorganic acids into a heated reaction chamber, the aforesaid disadvantages are overcome or at least partially removed by carrying out the fine atomization of the reaction mixture by means of the hot inert gases free from oxygen and preferably containing steam, which are simultaneously introduced into the reaction chamber. In this process, a better mixture and at the same time a more favourable heat transfer than have hitherto been possible are obtained.

According to another conception of the present invention, the angle of aperture of the spraying jet is kept so small—no matter in what direction the spraying takes place—that the substances sprayed in do not come into contact with the wall of the reaction furnace that is additionally heated from outside, before the organic components of the reaction are completely gasified. The temperature of the externally heated walls of the furnace through which the gases charged with phosphoric acid vapours flow, corresponds at least to the temperature of the reaction mixture contained in the reaction chamber, but preferably it is a little higher.

It is also possible to supply merely steam instead of the hot inert gases that are free from oxygen and preferably contain steam. The hot inert gases free from oxygen can be obtained by burning a mixture of illuminating gas and air and before being introduced into the reaction chamber they may be cooled to temperatures within the range of about 800° C. to about 1700° C. by mixing them with cold nitrogen or waste gases free from oxygen, for example combustion gases and/or steam.

The reaction gases leaving the reaction chamber are cooled by direct injection of water or hydrous phosphoric acids. This cooling and washing liquid is subsequently separated as distillation residue from the reaction products, part of which are contained therein, together with the acid introduced into the reaction chamber in the form of the atomized starting mixture. The separation of the reaction products from the cooling and washing liquid can be brought about by a steam distillation under normal pressure or in vacuo.

According to the invention, the phosphoric acid contaminated with salts and condensation products adhering to it is treated with an anhydrous liquid phase that is miscible with, and chemically indifferent towards, phosphoric acid, in order to precipitate and separate the salts and in the course of the re-concentration brought about by heating the acid is treated with small quantities of nitric acid in order to eliminate the organic impurities. Subsequently, the pure concentrated phosphoric acid may be re-introduced in a cycle into the reaction, that is to say, it may be used again for the formation of the reaction mixture. As anhydrous liquid phase which is chemically indifferent towards phosphoric acid, there may be used cyanohydrins which at the same time serve as starting substances for the reaction.

For the preparation of α,β-unstaurated carboxylic acid nitriles, there may be used according to the present invention the corresponding α-hydroxy-carboxylic acid nitriles or also the corresponding α-hydroxy-carboxylic acid amides. In the latter case a double splitting off of water takes place.

The apparatus modification for carrying out the process of the invention substantially consists of a reaction furnace provided along its entire length wtih a jacket heating and of two nozzles mounted at the component introduction end. The two nozzles are disposed concentrically with respect to one another. The hot inert gases that are free from oxygen and which are supplied by a pipe enter the reaction chamber through the outer nozzle whereas the liquid reaction mixture which is supplied via another pipe enters the reaction chamber through the inner nozzle. At the discharge end of the reaction chamber, an injecting device serving for the cooling of the reaction gases leaving the reaction furnace is provided.

Figure 2:
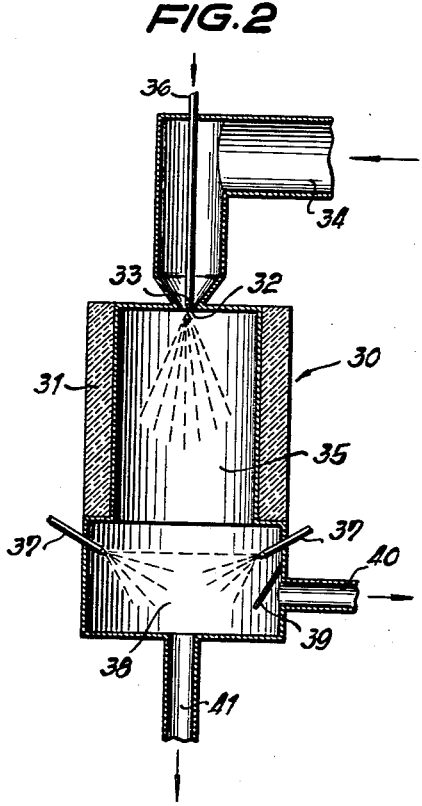
Figure 3:
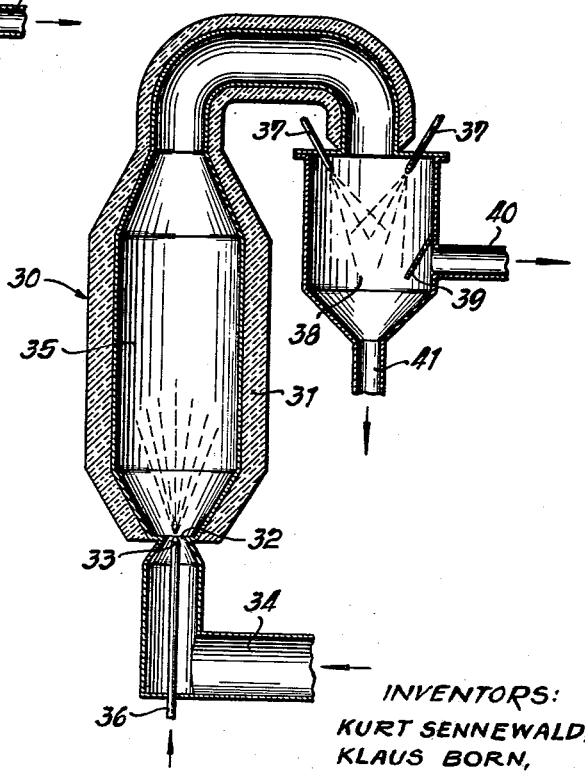

Two modifications of the apparatus for carrying out the process of the invention are shown diagrammatically by way of example and partly in side elevation in FIGURES 2 and 3 of the accompanying drawing.

Referring to the drawing, the numeral 30 designates the reaction furnace. The reaction chamber 35 is surrounded with a heating jacket 31. The hot inert gases are supplied to the orifice or outer nozzle 32 through a pipe 34 whereas the liquid reaction mixture is supplied through a pipe 36 to the inner nozzle 33 from where it enters the reaction chamber. After having passed the reaction chamber 35, the reaction gases are cooled in the cooling zone 38 by injection cooler 37, the condensate and the cooling liquid flowing off through the outlet pipe 41 and the gases leaving through the outlet 40. The numeral 39 designates a baffle plate disposed in the cooling zone 38 before the gas outlet 40. The heating jacket 31 can, of course, be provided with an insulating layer preventing the heat from being transferred to the outside.

The following remarks are made with regard to the process and the apparatus according to the invention:

The above-mentioned disadvantages can to a high degree be avoided or, in the case of the formation of foreign nitriles, be reduced to a minimum by carrying out the dehydration in an apparatus analogous to that diagrammatically illustrated in FIGURES 2 and 3. The hot burnt gases enter the reaction chamber 35 through the pipe 34 and the orifice or outer nozzle 32. In the middle of the orifice or in the center of the outer nozzle 32, the reaction mixture which consists, for example, of α-hydroxy-carboxylic acid nitrile and phosphoric acid is supplied to the reaction chamber either as liquid jet or liquid ring through pipe 36 and the inner nozzle 33. The immediate atomization of the liquid is brought about by means of the hot gases flowing at a high speed through the orifice or outer ring nozzle 32 and at the same time heat is supplied. In view of this arrangement, the liquid reaction mixture is atomized at its evaporation temperature, the surface tension being thus very much reduced during the atomization. Atomization and evaporation almost shade into one another. In this way, an extraordinarily fine atomization is attained which in its turn ensures a homogeneous mixture and a quick exchange of heat. The ordinary turbulence nozzles or gas spraying nozzles used in combination with an orifice may, of course, also be applied with a good result.

The form of the cross-sectional area of the furnace and the direction of flow may vary and be determined as appears suitable to those skilled in the art. The dimensions of the reaction chamber 35 are advantageously chosen so as to prevent the gas jet whose individual rays diverge from one another to form a cone from coming into contact with the wall before the reaction is nearly complete. The time required necessary for the reaction is determined by the distribution of liquid and gas. If the homogeneous distribution of the phase of liquid and gas takes place very quickly, a relatively small reaction chamber is sufficient. The higher the temperature of the burnt gases used as starting material may be, the more economical is the process. The highest admissible degree of temperature of the burnt gases depends decisively on the velocity of the mixing. The quicker and the more intense the mixing, the higher may be the temperature of the burnt gases used as starting material. If the temperature of the burnt gases is increased, the efficiency with respect to the available quantities of heat is also increased and, besides, the working up of the gaseous reaction products proceeds in a much more favourable way and can be carried out in an apparatus of smaller dimensions since the proportion of the quantity of the final product to the quantity of burnt gases is more favourable. Moreover, when the reaction products are atomized according to the invention, the furnace can within wide limits be adapted to the desired conditions of reaction. It suffices for this purpose to adjust the orifice through which the gas enters to the quantity of gas that has to be supplied in each individual case.

Due to the immediate atomization by means of hot gases and to the uniform heat transfer associated therewith, the above-mentioned disadvantages of the known method of operating are avoided. The splitting of the organic starting materials, for example the cyanohydrins, into the corresponding keto compounds and hydrocyanic acid is suppressed to a large extent and a local superheating of any of the products participating in the reaction is completely avoided. This new method thus clearly ensures a stabilization of the conditions in the furnace.

Another characteristic feature of the present invention is that reaction chambers are used that are heated from outside. By this outside heating which enables the temperature of the wall of the furnace to be adjusted to a temperature slightly above the temperature of the reaction chamber in the interior of the furnace, that is to say above the temperature of the reaction gases, the phosphoric acid vapours are prevented from condensing at the walls of the furnace and consequently the secondary formation of coke layers and the appearance of phenomena of corrosion are avoided. The difference between the temperature of the wall of the furnace and that of the reaction gases contained in the interior of the furnace need not exceed about 5 to 20° C. The difference of temperature may, of course, also exceed this range though this is not necessary. In view of such heating from outside, the wall of the furnace may be made not only of ceramic but also of metallic materials. This fact offers considerable advantages with respect to the construction of the apparatus.

The method of the present invention of heating the reaction furnace from outside can generally be applied in all cases in which gases and vapours containing phosphoric acid vapours have to be transported at elevated temperatures. A contact between the wall and the acid vapours which would lead to further wetting is thereby avoided since the heat moves away from the walls. The temperatures of the wall should at least be above about +400° C. and in any case they should be above the temperature of the gaseous mixture flowing through the apparatus and containing the phosphoric acid.

Another advantage of the invention is that the formation of relatively large quantities of foreign nitriles is avoided. As has already been mentioned, foreign nitriles form when the liquid reaction mixtures come into contact with the walls of the reaction furnace. With the mode of operation which has been described above and according to which the reaction chambers are heated from outside, the reaction mixture is immediately atomized by the hot gases and the phase of gases and liquid is consequently homogeneously mixed, a contact of the aforesaid kind is avoided and the formation of foreign nitriles is suppressed to a large extent. When operating according to the process described in U.S. Patent No. 2,790,822 about 4 to 8% by weight of foreign nitriles is contained, for example, in the acrylonitrile obtained as final product whereas when carrying out the process according to the present invention only about 1.5 to 3% by weight of foreign nitriles form. This fact means a considerable increase of the yield and, moreover, the crude acrylonitrile obtained by this process can more easily be worked up into pure acrylonitrile.

As can be seen from the examples given in U.S. Patent No. 2,790,822 the dehydration of, for example, cyanohydrins is carried out in the presence of relatively large quantities of phosphoric acid. The process is consequently only economical if the quantity of phosphoric acid used can be recovered and recycled to the process. In the course of the reaction, a saponification resulting in the formation of ammonium salts takes place and a small amount of condensation product of resinous, oily consistency forms. The resinous constituents and the ammonium salts accumulate in the aqueous phosphoric acid which is condensed at the outlet of the furnace by injection cooling. It cannot be avoided that a small quantity, viz. about 0.05 to 0.6% by weight of the cyanohydrin used as starting material also accumulates in the aforesaid aqueous phosphoric acid. The ammonium salts that accumulate in the phosphoric acid prevent a continuous circulation of the acid since, due to the presence of the ammonium salts, the acid quickly loses its capacity of mixing with the organic phase. It has been found that the precipitation of salts from the phosphoric acid can be forced by evaporating this free acid until its concentration is about 85% and by subsequently mixing it with an anhydrous liquid organic phase miscible with, and chemically indifferent towards, phosphoric acid. A primary phosphate crystallizes out, the mixture being moderately heated if necessary. In the present case it is suitable to use the almost anhydrous cyanohydrins that are to be mixed with the phosphoric acid.

In the same way as with ammonium phosphate, other primary phosphates can be crystallized out from concentrated phosphoric acid.

Due to the resinous, oily by-products accumulating in the aqueous phosphoric acid and the small content of cyanohydrin of this acid there forms, upon concentrating the aqueous phosphoric acid by heating, an acid having a consistency different from that of the acid originally used, whose colour is darkened due to the presence of organic decomposition products. If about 1% by volume of nitric acid is added, the concentrated phosphoric acid recovered by the concentration of the diluted phosphoric acid is almost colourless, free from nitric acid and NO and can be re-cycled to the reaction without diffculty after having been mixed with the organic starting material.

In summary, the process according to the invention which is directed to the preparation of $\alpha,\beta$-unsaturated carboxylic acids and/or their derivatives by dehydration from $\alpha$-hydroxy-carboxylic acids and/or their derivatives at elevated temperatures, preferably temperatures within the range of +400° C. and +700° C., with a short time duration in the presence of a catalyst consisting of a hydrous inorganic acid, preferably phosphoric acid, by atomizing the mixture of $\alpha$-hydroxy-carboxylic acids or their derivatives and the hydrous inorganic acids into a heated reaction chamber, comprises heating the reaction chamber by the introduction of hot inert gases that are free from oxygen and finely spraying the reaction mixture within the current of these hot inert gases that are free from oxygen and advantageously contain steam into the reaction chamber. The direction in which the starting material is sprayed through the nozzles is advantageously the same as the direction in which the hot gases flow.

The fine atomization of the reaction mixture can also immediately be brought about by means of the hot inert gases that are free from oxygen and advantageously contain steam and which are simultaneously supplied to the reaction chamber. The angle of aperture of the jet of atomized reaction mixture is preferably so small—no matter which is the direction of the jet—that the material does not come into contact with the inner wall of the reaction chamber that is additionally heated from outside before the organic reaction components are completely gasified. Moreover, the temperature of the externally heated walls of the reaction furnace through the gases charged with phosphoric acid vapours flow should at least correspond to, and preferably be a little above, the temperature of the reaction mixture contained in the reaction chamber.

The hot inert gases that are free from oxygen can be obtained by burning a mixture of illuminating gas and air and before being introduced into the reaction chamber they can be cooled to a temperature within the range of about +800° C. to about +1700° C., preferably +800° C to +1400° C., by mixing them with cold nitrogen or waste gases that are free from oxygen, for example combustion gases, and/or with steam. It is also possible to supply steam alone instead of the hot inert gases that are free from oxygen and preferably contain steam.

The reaction gases leaving the reaction chamber are cooled by direct injection of water or aqueous phosphoric acids. This cooling and washing liquid is subsequently separated as distillation residue, together with the acid introduced into the reaction chamber in the form of the atomized starting mixture, from the portion of reaction products contained therein.

The separation of the reaction products from the cooling and washing liquid is brought about by a steam distillation under normal pressure or in vacuo. The phosphoric acid contaminated with salts and condensation products adhering to it is treated with an anhydrous liquid phase that is miscible with and chemically indifferent towards phosphoric acid in order to precipitate and separate the salts. In the course of the concentration brought about by heating, the acid is treated with small quantities of nitric acid in order to eliminate the organic impurities. Subsequently, the pure concentrated phosphoric acid may be re-introduced in a cycle into the reaction. As anhydrous liquid phase which is chemically indifferent towards phosphoric acid, there may be used cyanohydrins which at the same time may serve as starting substances for the reaction.

For the preparation of $\alpha,\beta$-unsaturated carboxylic acids and/or their derivatives, there are used according to the invention the corresponding $\alpha$-hydroxy-carboxylic acids and/or their derivatives. By acid derivatives there are here to be understood, for example, carboxylic acid amides, N-monosubstituted carboxylic acid amides, N-disubstituted carboxylic acid amides, acid nitriles and carboxylic acid esters. For example, for the preparation of $\alpha,\beta$-unsaturated carboxylic acid nitriles there are used the corresponding $\alpha$-hydroxy-carboxylic acid nitriles or $\alpha$-hydroxy-carboxylic acid amides. For example, for the preparation of $\beta$-ethyl-acrylonitrile, crotonic acid nitrile, methacrylic acid nitrile or acrylonitrile, there are accordingly used $\alpha$-hydroxy-valeric acid nitrile, $\alpha$-hydroxy-butyric acid nitrile, acetone-cyanohydrin, lactic acid nitrile or also lactic acid amide.

For the preparation of $\alpha,\beta$-unsaturated carboxylic acids, there may be used the corresponding $\alpha$-hydroxy-carboxylic acids or $\alpha$-hydroxy-carboxylic acid esters. Acrylic acid may accordingly be prepared from lactic acid or, for example, lactic acid ethyl ester.

Besides, there may be used for the preparation of aliphatic $\alpha,\beta$-$\gamma,\delta$-unsaturated carboxylic acids and/or their derivatives $\beta$-$\gamma$-unsaturated or $\gamma,\delta$-unsaturated $\alpha$-hydroxy-carboxylic acids or $\alpha$-hydroxy-$\gamma$-hydroxy-carboxylic acids and/or their derivatives. As acid derivatives, there may be used, for example, carboxylic acid amides, N-monosubstituted carboxylic acid amides, N-disubstituted carboxylic acid amides, acid nitriles and carboxylic acid esters. For the preparation of 1-cyanobutadiene-(1,3) there is accordingly used crotonaldehyde cyanohydrin or acetaldol cyanohydrin.

For the preparation of 2-cyanobutadiene-1,3 and/or its derivatives there may be used methyl vinyl ketone cyanohydrin, acetoin cyanohydrin or the cyanohydrin of 3-keto-butanol-1 and/or the derivatives of these substances, for example the carboxylic acid amides, N-monosubstituted and N-disubstituted carboxylic acid amides, carboxylic acids and carboxylic acid esters.

For the preparation of cyclic unsaturated cyano compounds, there are used the corresponding cyclic cyanohydrins. For example, for the preparation of 1-cyanocyclohexene-1 and/or its derivatives there are used cyclohexanone cyanohydrin and/or its derivatives, for example, the carboxylic acid amides, N-monosubstituted carboxylic acid amides, N-disubstituted carboxylic acid amides, carboxylic acids and carboxylic acid esters.

Simultaneously with the dehydration in $\alpha,\beta$-position, there may occur a saponification of the acid derivatives, for example a saponification of the esters, amides or nitriles resulting in the formation of carboxylic acid, a saponification of the nitriles resulting in the formation of amides or even an additional dehydration in the amido groups resulting in the formation of the corresponding nitrile may take place.

The following examples serve to illustrate the invention but they are not intended to limit it thereto.

*Example 1*

In a combustion chamber 4 (see FIGURE 1) which has an internal height of about 100 mm. and an internal diameter of about 200 mm. and is lined with firebricks 1.6 m.³/h. (measured at N.T.P.) of illuminating gas and 5.7 m.³/h. (at N.T.P.) of air are completely burnt. The superheated combustion gases that are free from oxygen are cooled to about 1050° C. by means of nitrogen or waste gases that are free from oxygen. At this temperature, they enter through the annular slot 18 into the insulated reaction furnace 5 which is lined with refined steel and which has a clear width of about 200 mm. and a length of about 800 mm. At the height of the annular slot 18, 1.58 kg./h. of a mixture consisting of 62.3% by weight of crotonaldehyde cyanohydrin and 37.7% by weight of phosphoric acid of 84% strength are simultaneously supplied through the nozzle 9 in a most finely divided form. At the end of the intense and homogeneous mixing of the hot gases with the atomized mixture of crotonaldehyde cyanohydrin and phosphoric acid which sets in immediately, the temperature in the reaction furnace 5 is about 550° C. The duration of stay of the reaction mixture in the furnace is about 3.6 seconds. Upon leaving the reaction furnace, the reaction gases are cooled to about 25 to 30° C. by directly injecting hydrous phosphoric acid through ring pipe 22. The condensate accumulating in the separator 11 disposed beyond the reaction furnace is freed by distillation from the reaction products it contains and from water. The phosphoric acid of about 80% strength which is thus obtained is mixed with fresh crotonaldehyde cyanohydrin for the purpose of being used again in the reaction furnace. It is then supplied to storage vessel 6. The cooled reaction gases which contain 1-cyanobutadiene-(1,3), hydrocyanic acid and crotonaldehyde leave the separator 11 through the pipe 12 and are subsequently washed with water in order to isolate the aforesaid constituents. When working up the wash water by distillation, 0.49 kg. of 1-cyanobutadiene-(1,3) are obtained in admixture with 0.09 kg. of hydrocyanic acid and 0.23 kg. of crotonaldehyde. After having once passed the furnace, 61% of the crotonaldehyde cyanohydrin used as starting material has been converted into 1-cyanobutadiene-(1,3). Since the recovered portions of hydrocyanic acid and crotonaldehyde can easily be converted into crotonaldehyde cyanohydrin that can be recycled to the process, the total yield of 1-cyanobutadiene-(1,3) amounts to 91% calculated on the total quantity of crotonaldehyde cyanohydrin used as starting material and consumed.

*Example 2*

In the apparatus described in Example 1, 1.8 m.³/h. (measured at N.T.P.) of illuminating gas are completely burnt with 6.5 m.³/h. (at N.T.P.) of air and the superheated combustion gases that are free from oxygen are cooled to about 1120° C. by means of waste tail gases that are free from oxygen. At a temperature of about 1120° C., the gases of the combustion chamber enter the reaction furnace 5 through the annular slot 18. At the same time 1.31 kg./h. of a mixture consisting of 63.6% by weight of acetaldol cyanohydrin and 36.4% by weight of phosphoric acid of about 84% strength are introduced via nozzle 9. After the hot combustion gases are intensely mixed with the atomized reaction mixture consisting of acetaldol cyanohydrin and phosphoric acid, the reaction temperature in the reaction furnace 5 is about 660° C. The duration of time of the material in the furnace is about 2.8 seconds. Upon leaving the furnace the reaction gases are worked up in the manner described in Example 1 and 0.34 kg. of 1-cyanobutadiene-(1,3) is obtained in admixture with 0.07 kg. of hydrocyanic acid and 0.17 kg. of crotonaldehyde. Accordingly, 58.8% of the aldol cyanohydrin has been converted into 1-cyanobutadiene-(1,3) after having once passed the furnace. Since the recovered portions of hydrocyanic acid and of the crotonaldehyde that has formed from aldol can easily be converted into crotonaldehyde cyanohydrin that may be re-used the total yield of 1-cyanobutadiene- (1,3) amounts to 88% calculated on the total quantity of acetaldol cyanohydrin used as starting material and consumed. The recovered crotonaldehyde cyanohydrin may be re-used either in the manner described in Example 1 or in admixture with acetaldol cyanohydrin and it can likewise be converted into cyanobutadiene.

*Example 3*

When operating in the manner described in Examples 1 and 2 and using a mixture consisting of 64.3% by weight of methyl vinyl ketone cyanohydrin and 35.7% by weight of phosphoric acid of about 80% strength which remains in the reaction chamber for about 1.5 seconds at a reaction temperature of about 570° C., 2-cyanobutadiene-(1,3) is obtained in a total yield of 74.3% calculated on the total quantity of methyl vinyl ketone cyanohydrin used as starting material and consumed. The quantity of starting material that has undergone conversion after having once passed the reaction furnace is 45.4%.

*Example 4*

When operating in the manner described in Examples 1 and 2 and using a mixture consisting of 69.5% by weight of cyclohexanone cyanohydrin and 30.5% of phosphoric acid of 75% strength, which remains in the reaction chamber for 0.9 second at a temperature of about 620° C., 1-cyanocyclohexene-1 is obtained in a total yield of 78.1% calculated on the total quantity of cyclohexanone cyanohydrin that has been used as starting material and consumed. After having once passed the reaction furnace, 43.0% of the material has undergone conversion.

*Example 5*

In a combustion chamber, 3.0 m.$^3$/h. (at N.T.P.) of illuminating gas and 11.0 m.$^3$/h. (at N.T.P.) of air are completely burnt and the hot combustion gases that are free from oxygen are supplied at a temperature of 1220° C. via the pipe 34 (see FIGURE 2) and the orifice or nozzle 32 to the reaction chamber 35 of the reaction furnace 30. The reaction chamber 35 has a length of 900 mm. and an internal diameter of 150 mm. At the same time, 5.45 kg./h. of a mixture consisting of 62.1% by weight of lactic acid nitrile and 37.9% by weight of phosphoric acid of 85% strength are supplied through the nozzle 33. With an internal diameter of the orifice of 10 mm. and a velocity of gas in this orifice or nozzle 32 of 225 metres/second, the liquid reaction mixture is immediately atomized by means of the hot combustion gases after it has left the central nozzle 33 which is arranged at the height of the orifice 32. The cone of atomization formed by the jet of gas and liquid has an angle of about 14 to 40° C. In view of the turbulence of gas prevailing in the orifice or nozzle 32 and the effect of atomization that can thereby be obtained, it is not necessary that the nozzle 33 is a nozzle of the kind that has hitherto usually been applied, nor is it necessary to operate under a high pressure of atomization. It is entirely sufficient to introduce the liquid reaction mixture into the reaction chamber in a uniform jet and under normal pressure or under a slightly elevated pressure of, for example, 0.1 to 1.0 atmosphere (gauge) through a bore which has a diameter of about 1 mm. and which is arranged at the end of the pipe 36, the place where the jet enters the reaction chamber being exactly in the middle of the orifice or outer nozzle 32. If very large quantities, for example, quantities of more than 100 kg./h. are to be put through, it is, however, suitable to previously atomize the mixture and then to atomize the thick liquid jet within the orifice or nozzle 32 at the moment it enters the reaction chamber. Such a previously atomization can already be brought about by means of an ordinary low pressure nozzle run with a pressure of about 1 to 3 atmospheres (gauge) and which does not bring about a very fine atomization.

After the atomization of the above-mentioned mixture of lactic acid nitrile and phosphoric acid by means of the hot gases, the reaction temperature is 650° C. At this temperature, the reaction gases flow through the reaction chamber 35 of the reaction furnace 30, which is provided with a heating jacket 31. The wall of the furnace has a temperature of 665° C. and the reaction gases remain in the furnace for 1.1 seconds. At the outlet of the furnace, the reaction gas which has a temperature of 600 to 650° C. is cooled to 20 to 30° C. by direct injection of aqueous phosphoric acid or water and the condensate obtained in the following separator, which contains the phosphoric acid is freed by distillation from the portion of reaction products contained therein, and from the excess of water. The phosphoric acid of about 80 to 85% strength which is thus recovered may again be mixed with fresh lactic acid nitrile in order to be re-used in the reaction furnace and it may then be recycled to the process.

The cooled reaction gases that contain acrylonitrile, hydrocyanic acid and acetaldehyde leave the separator for phosphoric acid through the pipe 40 and they are subsequently washed with water in order to isolate the aforesaid constituents. Upon working up the wash water by distillation, there are obtained, per hour, 1.82 kg. of acrylonitrile, 0.51 kg. of acetaldehyde and 0.33 kg. of hydrocyanic acid, the portions of the substances obtained by distillation from the aforesaid condensate being included in the aforesaid figures. The quantity of lactic acid nitrile used as starting material which is converted into acrylonitrile after having once passed the furnace accordingly amounts to 72.1%. Since the recovered portions of hydrocyanic acid and acetaldehyde can easily be transformed into lactic acid nitrile that may again be used in the process, the total yield of acrylonitrile amounts to 96.5% calculated on the hydrocyanic acid contained in the lactic acid nitrile and that has been consumed and it amounts to 95.1% calculated on the acetaldehyde contained in the lactic acid nitrile and that has been consumed.

The acrylonitrile that has thus been prepared contains but 1.6% by weight of by-products, that is to say nitriles other than acrylonitrile. When operating under similar conditions according to the method of U.S. Patent No. 2,790,822, 6.1% by weight of nitriles other than acrylonitrile is obtained.

The conversion of lactic acid nitrile into acrylonitrile that has been described in this example is carried out in the apparatus illustrated diagrammatically in FIGURE 1. In this apparatus the atomization of the mixture consisting of lactic acid nitrile and phosphoric acid takes place in a downward direction. The process can be carried out just as successfully in an apparatus analogous to that illustrated in FIGURE 2 in which the atomization takes place in an upward direction, neither a decrease of the quantity of starting material undergoing conversion nor a loss of yield being thereby caused.

*Example 6*

A mixture consisting of 59.3% by weight of lactic acid nitrile, 33.8% by weight of phosphoric acid and 6.9% by weight of water is reacted in the manner and the apparatus described in Example 5. The combustion gases used to atomize the mixture have a temperature of 1380° C., the reaction temperature is 630° C. and the temperature of the furnace wall is 635° C. The duration of stay in the reaction chamber is 2.1 seconds. After having once passed the reaction furnace, 68.9% of the starting material is converted into acrylonitrile. If the yield is calculated on the substances used as starting materials for the preparation of the lactic acid nitrile, viz. acetaldehyde and hydrocyanic acid, the total yield amounts to 91.8% calculated on the acetaldehyde and to 93.8% calculated on the hydrocyanic acid.

*Example 7*

A mixture consisting of 65.0% by weight of lactic acid nitrile, 27.3% by weight of phosphoric acid and 7.7% by weight of water is reacted in the manner and the apparatus described in Example 5. The combustion gases used to atomize the aforesaid mixture have a temperature of 1680° C., the reaction temperature is 670° C. and the temperature of the furnace wall is 695° C. The duration in the reaction chamber is 0.8 second. After having once passed the furnace 63.7% of the starting material has been converted into acrylonitrile. If the yield is calculated on the substances used for the preparation of the lactic acid nitrile, viz. acetaldehyde and hydrocyanic acid, the total yield amounts to 87.1% calculated on the acetaldehyde and to 89.6% calculated on the hydrocyanic acid.

*Example 8*

A mixture consisting of 63.4% by weight of lactic acid amide, 20.1% by weight of phosphoric acid and 16.5% by weight of water is reacted in the manner and in the apparatus described in Example 5. The combustion gases used to atomize the mixture have a temperature of 1180° C., the reaction temperature is 650° C. and the temperature of the furnace wall is 660° C. The duration in the reaction chamber amounts to 3.2 seconds. After having once passed the furnace 53.1% of the material has been converted into acrylonitrile. The portion that has not undergone conversion does, however, not leave the furnace in the form of lactic acid amide but is split into acetaldehyde and hydrocyanic acid, the splitting being associated with a dehydration of the amido group. Since acetaldehyde and hydrocyanic acid can easily be converted into lactic acid nitrile that can be used again, the total yield of acrylonitrile calculated on the substances used for the preparation of the lactic acid amide, viz. acetaldehyde and hydrocyanic acid, amounts to 80.5% calculated on the acetaldehyde and to 81.0% calculated on the hydrocyanic acid. The lactic acid nitrile that has been obtained can again be used either in the manner described in the preceding examples or in admixture with lactic acid amide and it can thus be also converted into acrylonitrile.

The acrylonitrile obtained by the process described in Examples 5 to 8 contains about 1.6 to 2.5% by weight of foreign nitriles whereas when the furnace according to U.S. Patent No. 2,790,822 is used the portion of these undesired foreign nitriles amounts to 4 to 8% by weight of the acrylonitrile obtained.

Among the most essential advantages the present invention offers, there is not only the increase of the quantities of starting material undergoing conversion and the increase of the yields but especially the possibility of carrying out the process in continuous operation which is due to the fact that any cracking and coking is prevented in the reaction furnace.

We claim:
1. In the process for preparing a compound selected from the group consisting of 1-cyanobutadiene-1,3, 2-cyanobutadiene-1,3, 1-cyanocyclohexene-1 and acrylonitrile, by heating a compound selected from the group consisting of crotonaldehyde cyanohydrin, methyl vinyl ketone cyanohydrin, cyclohexanone cyanohydrin, and lactic acid nitrile respectively with phosphoric acid, whereby the compound to be heated and phosphoric acid are blown as a finely divided reaction mixture into a reaction chamber at a temperature of from about 520 to 700° C., the amount of said acid by weight being from 1–90% of the total weight of the reactants, the improvement of heating the reaction chamber by introducing thereinto a current of hot inert gases free of oxygen, instantaneously heating the reaction mixture by finely atomizing the reaction mixture into the reaction chamber with the current of the said hot inert gases, maintaining the angle of aperture of the jet of atomized reaction mixture so small that the mixture sprayed does not come into contact with the wall of the reaction chamber after the reaction components are completely gasified at a temperature at least equal to the temperature of the reaction mixture, additionally heating the reaction chamber from outside, cooling the reaction gases leaving the reaction chamber by a direct injection of at least one cooling and washing liquid selected from the group consisting of water and aqueous phosphoric acids, and separating the reaction product from said cooling and washing liquid by distillation.

2. A process as claimed in claim 1 wherein hot inert gases that are free from oxygen and contain steam are used.

3. A process as claimed in claim 2, wherein merely steam is introduced instead of the hot inert gases that are free from oxygen and contain steam.

4. A process as claimed in claim 1, wherein the cooling and washing liquid is separated together with the phosphoric acid introduced into the reaction chamber in the form of the atomized starting mixture as distillation residue from the reaction products contained in said liquid.

References Cited in the file of this patent
UNITED STATES PATENTS

| | | |
|---|---|---|
| 2,512,587 | Stengel | June 20, 1950 |
| 2,535,730 | Gadret | Dec. 30, 1950 |
| 2,765,359 | Pichler et al. | Oct. 2, 1956 |
| 2,790,822 | Wolfram et al. | Apr. 30, 1957 |